UNITED STATES PATENT OFFICE.

WILLIAM L. THOMPSON, OF BOSTON, MASS., ASSIGNOR TO THE THOMPSON MINING AND SULPHATE PROCESS COMPANY, OF SAME PLACE.

WET PROCESS FOR THE EXTRACTION OF GOLD AND SILVER.

SPECIFICATION forming part of Letters Patent No. 249,419, dated November 8, 1881.

Application filed January 13, 1881. (No specimens.)

*To all whom it may concern:*

Be it known that I, WILLIAM L. THOMPSON, of Boston, in the county of Suffolk and State of Massachusetts, have invented certain Improvements in Wet Processes for the Extraction of Gold and Silver, of which the following is a specification.

This invention has for its object to provide an improved process for the extraction of precious metals from two subdivisions of the class of ores known as "smelting" ores in contradistinction to those known as "free-milling" ores, viz: first, the pyrites division bearing gold and some copper, and second, the silver and gold bearing division, containing antimony, arsenic, and the like.

My invention provides a cheap and efficient means of extracting the precious metals; and it consists in, first, removing the baser metals by the formation of soluble double sulphides of the base metals and the alkaline metals, and secondly, removing the gold by the fusion of the residuum with an alkaline polysulphide, forming a soluble compound, from which the precious metal may be readily recovered.

The several steps of the process I will now proceed to describe in detail.

In treating the pyrites ores I prefer to proceed as follows: The ores are first pulverized and mixed with the sulphide or sulphate of soda, and the mixture is then subjected to a roasting-heat. In practice, with every one hundred parts of an ore containing, say, forty per cent. of the base metals, I would add about eighty parts of the sulphide of soda, or about one hundred and thirty parts of the sulphate of soda; but these proportions vary widely with the quality of the ore, and I by no means confine myself to them. A soluble compound is thus formed when the sulphide is used which may be called a double sulphide of sodium and iron, and may be chemically expressed as $Na_2Fe_2S_4$. The formation of this compound may be facilitated if the sulphate is used by the use of a reducing-flame or by adding coal in small quantities to said mixture. The soluble compound is next removed by leaching with water. The residue containing the gold is then fused with a polysulphide of an alkaline metal, such as sodium or potassium, thus forming in the latter case the aurosulphide of potassium, a soluble compound containing, substantially, all the gold in the ore, and finally the mass is treated with water to separate the aurosulphide of potassium from the residue in the form of a solution. As for the proportion of the polysulphide, enough is added to make a ball of the stuff when molten—that is, the liquid polysulphide makes a mud with the ore. More is used for a light ore than for a dense ore, and one-half the weight of the ore would be a fair proportion in ordinary cases. The process of chemical concentration or chemical separation of the base metals from the precious is thus completed, and the gold in the solution may be recovered by any of the well-known methods—such as by boiling or treatment with acids.

In treating the other divisions of ores—viz., those containing antimony or arsenic—the ore is pulverized and fused with an alkaline monosulphide, and then treated with water, thereby obtaining the sulphantimonite or the sulpharsenite of the alkaline metal in solution and leaving the ore concentrated. In these cases, to every one hundred parts of an ore containing, say, fifty per cent. of base metals, I would add, in practice, say from sixty to eighty parts of the alkaline monosulphide; but, as before stated, circumstances would cause these proportions to be widely departed from in many instances, and I only state them by way of illustration in ordinary cases, and without in any way limiting myself thereto. From the residue the precious metals may be extracted by any suitable method, as by fusion with a polysulphide of an alkaline metal, which extracts the gold, and the silver may be extracted as sulphate by well-known processes which oxidize the sulphide already formed.

I am aware of the process described by Henderson in his English Patent No. 883 of 1859, and claim nothing that is therein set forth. Henderson first forms a regulus or matte of from thirty to forty per cent. of copper, which is the usual initial step. He then fuses the matte and adds sulphate of sodium to take up the sulphide of gold; then casts in molds and leaches out the aurosulphide of sodium. In my process I form no matte, but work the raw ore with monosulphide of sodium, or its equivalent, to extract the iron, antimony, and arsenic, and treat the ore deprived of these elements with a polysulphide of sodium or potassium, to cause the free gold to form an aurosulphide. Henderson nowhere alludes to the use of polysulphides, and this is an essential feature of my process.

Having thus described my invention, I claim—

1. The process of extracting precious metals from the sulphide ores by removing any iron, antimony, or asenic therein contained by means of and in combination with the monosulphides of the alkaline metals, as double sulphides, as set forth, and afterward removing the gold by fusion with an alkaline polysulphide, and then leaching, substantially as set forth.

2. The process of extracting precious metals from the sulphide ores by removing any iron, antimony, or arsenic therein contained by means of and in combination with the monosulphides of the alkaline metals, as double sulphides, as set forth, and afterward removing the gold by fusion with an alkaline polysulphide and leaching, and finally removing the silver, as sulphate, by oxidation of the sulphide of silver already formed, substantially as set forth.

In testimony whereof I have signed my name to this specification, in the presence of two subscribing witnesses, this 11th day of January, A. D. 1881.

WILLIAM L. THOMPSON.

Witnesses:
C. F. BROWN,
W. CLIMO.